US012641203B2

(12) United States Patent
Peng et al.

(10) Patent No.: US 12,641,203 B2
(45) Date of Patent: May 26, 2026

(54) METHOD FOR ADJUSTING PROJECTION PARAMETER AND PROJECTION SYSTEM

(71) Applicant: Coretronic Corporation, Hsin-Chu (TW)

(72) Inventors: Chien-Chun Peng, Hsin-Chu (TW);
Chia-Yen Ou, Hsin-Chu (TW);
Kang-Shun Hsu, Hsin-Chu (TW);
Hsun-Cheng Tu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 421 days.

(21) Appl. No.: 18/495,747

(22) Filed: Oct. 26, 2023

(65) Prior Publication Data

US 2024/0146883 A1 May 2, 2024

(30) Foreign Application Priority Data

Oct. 28, 2022 (CN) .......................... 202211332111.3

(51) Int. Cl.
*H04N 9/31* (2006.01)

(52) U.S. Cl.
CPC ......... *H04N 9/3105* (2013.01); *H04N 9/3147* (2013.01); *H04N 9/3182* (2013.01); *H04N 9/3194* (2013.01)

(58) Field of Classification Search
CPC .. G03B 21/005; G03B 21/006; G03B 21/008; G03B 21/14; G03B 21/28; G03B 21/145; G03B 21/147; G03B 21/2053; H04N 9/315; H04N 9/3105; H04N 9/3126; H04N 9/3141; H04N 9/3147; H04N 9/3152; H04N 9/3182; H04N 9/3185; H04N 9/3194
See application file for complete search history.

(56) References Cited

U.S. PATENT DOCUMENTS

| 11,082,672 | B2 | 8/2021 | Cian et al. | |
| 11,758,099 | B2 | 9/2023 | Cian et al. | |
| 2019/0219903 | A1* | 7/2019 | Agustin | H04N 9/3147 |
| 2019/0238807 | A1* | 8/2019 | Furui | H04N 9/3194 |
| 2021/0127096 | A1 | 4/2021 | Lin et al. | |
| 2021/0377501 | A1* | 12/2021 | Tu | H04N 9/3147 |

FOREIGN PATENT DOCUMENTS

CN           103731648           4/2017

* cited by examiner

*Primary Examiner* — Sultan Chowdhury
(74) *Attorney, Agent, or Firm* — JCIPRNET

(57) ABSTRACT

A method for adjusting a projection parameter and a projection system are disclosed. In the projection system, a processor is configured to drive multiple projectors to project multiple projection images respectively and obtain a full projection range through calculation, select a target area from at least one overlapping area included in the full projection range and obtain a target projection parameter value of the target area, obtain multiple intersection points of the overlapping area on a boundary of the full projection range, define connecting lines between a center point of the target area and the intersection points as dividing lines to divide the full projection range into multiple sub-areas, respectively adjust a projection parameter value of each of the sub-areas according to the target projection parameter value of the target area, and perform projection through the corresponding projector based on the adjusted projection parameter value of each of the sub-areas.

20 Claims, 6 Drawing Sheets

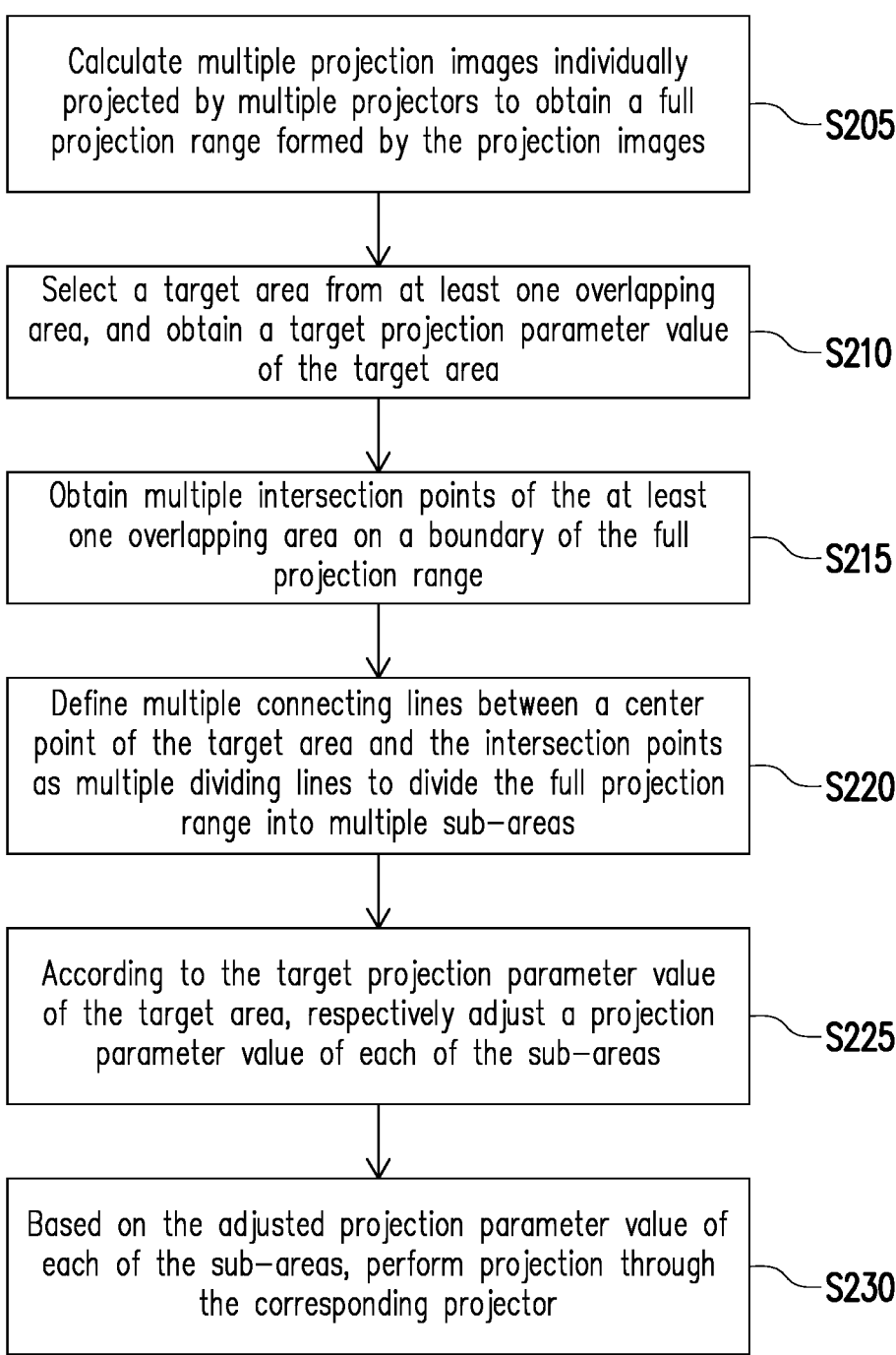

Calculate multiple projection images individually projected by multiple projectors to obtain a full projection range formed by the projection images ⸺ S205

Select a target area from at least one overlapping area, and obtain a target projection parameter value of the target area ⸺ S210

Obtain multiple intersection points of the at least one overlapping area on a boundary of the full projection range ⸺ S215

Define multiple connecting lines between a center point of the target area and the intersection points as multiple dividing lines to divide the full projection range into multiple sub-areas ⸺ S220

According to the target projection parameter value of the target area, respectively adjust a projection parameter value of each of the sub-areas ⸺ S225

Based on the adjusted projection parameter value of each of the sub-areas, perform projection through the corresponding projector ⸺ S230

METHOD FOR ADJUSTING PROJECTION PARAMETER AND PROJECTION SYSTEM

CROSS-REFERENCE TO RELATED APPLICATION

This application claims the priority benefit of China application serial no. 202211332111.3, filed on Oct. 28, 2022. The entirety of the above-mentioned patent application is hereby incorporated by reference herein and made a part of this specification.

BACKGROUND

Technical Field

The disclosure relates to a projection method and system, and more particularly, to a method for adjusting a projection parameter and a projection system.

Description of Related Art

A projection stitching technology is to integrate multiple projectors, so that projection images of the projectors may be merged into a complete stitched image, and the stitched image is displayed on display areas, such as an extended wall, a ring wall, an arc wall, and an irregular wall. For example, where projection ranges of the two projectors intersect, there will be an issue of an overlapping image, resulting in enhanced brightness in an overlapping area, so that brightness of the stitched image is uneven. The edge fusion technology is to adjust the overlapping area of the images projected by the projectors, so as to display a seam-free and brighter stitched image with higher resolution and uniform overall image brightness, so that the effect of the stitched image formed by the projection images projected by the projectors has image quality as if it is projected by one projector.

However, when the projector projects a black level image, due to a design tolerance or poor design of optical elements (such as light valves, projection lenses, etc.), a projected projection area has an issue of light leakage, causing a difference between the overlapping area and a non-overlapping area in the stitched image. In addition, the brightness of the overlapping area including intersection of more projection images will be brighter, thus causing image differences with other adjacent areas. Accordingly, it is necessary to adjust a projection parameter value of the black level image, so that the brightness and a color surface of the stitched image in the overlapping area and the non-overlapping area are consistent. In addition, how to efficiently adjust the black level image is one of the issues to be solved at present.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

A method for adjusting a projection parameter in the disclosure is performed through a processor. The method includes the following. Multiple projection images individually projected by multiple projectors are calculated to obtain a full projection range formed by the projection images. The full projection range includes at least one overlapping area, and the overlapping area corresponds to intersection of at least two of the projection images. A target area is selected from the overlapping area, and a target projection parameter value of the target area is obtained. Multiple intersection points of the overlapping area on a boundary of the full projection range are obtained. Multiple connecting lines between a center point of the target area and the intersection points are defined as multiple dividing lines to divide the full projection range into multiple sub-areas. According to the target projection parameter value of the target area, a projection parameter value of each of the sub-areas is respectively adjusted. Based on the adjusted projection parameter value of each of the sub-areas, projection is performed through the corresponding projector.

A projection system in the disclosure includes multiple projectors and a processor. The processor is coupled to the projectors, and the processor is configured to drive the projectors to respectively project multiple projection images, calculate the projection images to obtain a full projection range formed by the projection images, in which the full projection range includes at least one overlapping area, and the at least one overlapping area corresponds to intersection of at least two of the projection images, select a target area from the at least one overlapping area, and obtain a target projection parameter value of the target area, obtain multiple intersection points of the at least one overlapping area on a boundary of the full projection range, define multiple connecting lines between a center point of the target area and the intersection points as multiple dividing lines to divide the full projection range into multiple sub-areas, respectively adjust a projection parameter value of each of the sub-areas according to the target projection parameter value of the target area, and perform projection through the corresponding projector based on the adjusted projection parameter value of each of the sub-areas.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 is a flowchart of a method for adjusting a projection parameter according to an embodiment of the disclosure.

DETAILED DESCRIPTION OF DISCLOSED
EMBODIMENTS

It is to be understood that other embodiment may be
utilized and structural changes may be made without depart-
ing from the scope of the present disclosure. Also, it is to be
understood that the phraseology and terminology used
herein are for the purpose of description and should not be
regarded as limiting. The use of "including," "comprising,"
or "having" and variations thereof herein is meant to encom-
pass the items listed thereafter and equivalents thereof as
well as additional items. Unless limited otherwise, the terms
"connected," "coupled," and "mounted," and variations
thereof herein are used broadly and encompass direct and
indirect connections, couplings, and mountings.

The aforementioned and other technical contents, fea-
tures, and effects of the disclosure will be clearly presented
in the following detailed description of one of preferred
embodiments with reference to the drawings. Directional
terms used herein, such as upper, lower, left, right, front, or
rear merely refer to directions in the accompanying draw-
ings. Therefore, the directional terms are used to illustrate
rather than limit the disclosure.

The disclosure provides a method for adjusting a projec-
tion parameter and a projection system, which may effec-
tively adjust projection parameter values between overlap-
ping areas and non-overlapping areas, so as to improve
image quality of a full image formed by multiple projectors.
Other objectives and advantages of the disclosure may be
further understood from the technical features disclosed
herein.

Figure 1:
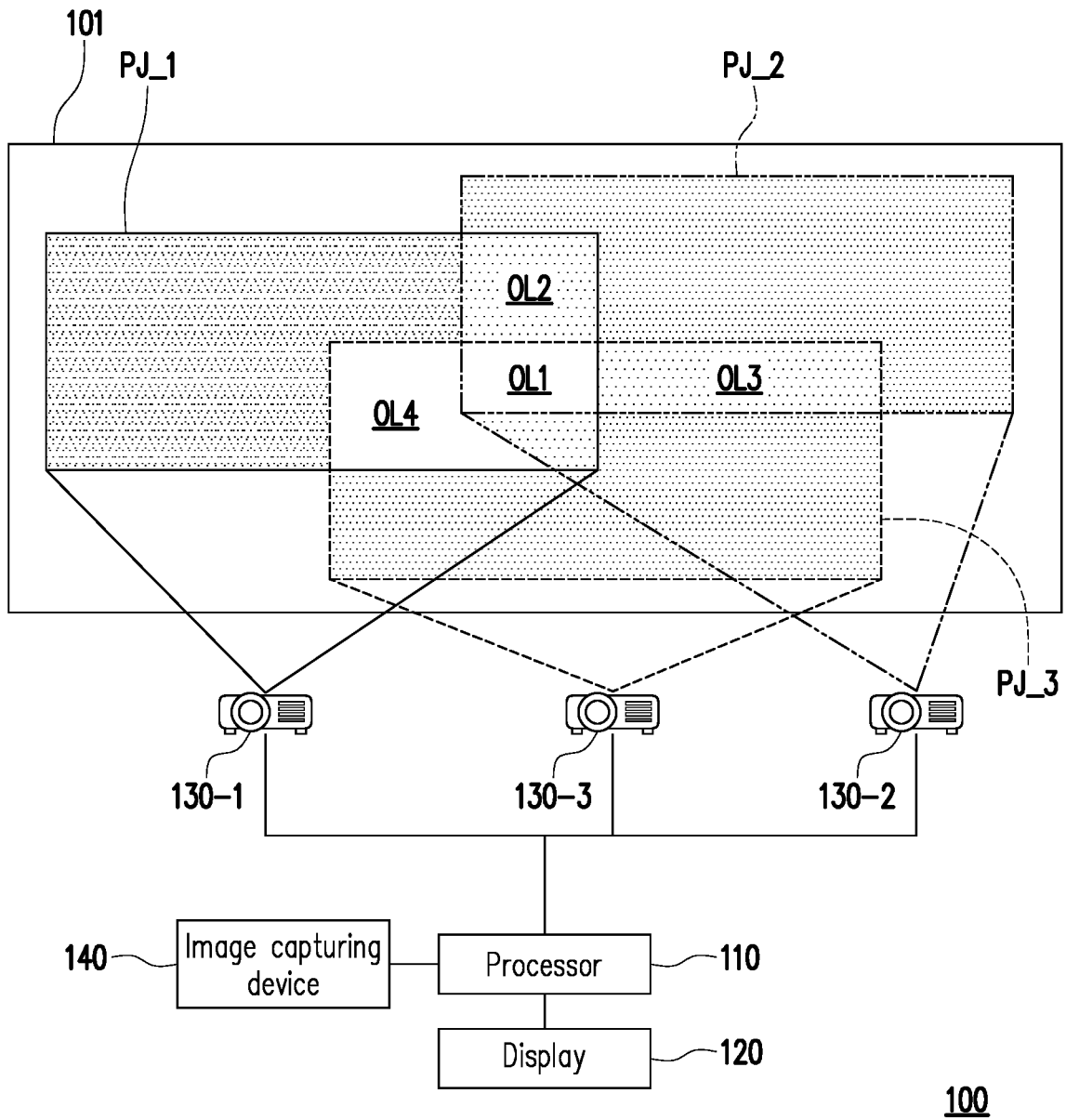
FIG. 1 is a view of an architecture of a projection system according to an embodiment of the disclosure.

FIG. 1 is a view of an architecture of a projection system
according to an embodiment of the disclosure. Referring to
FIG. 1, a projection system 100 includes a processor 110, a
display 120, projectors 130-1 to 130-3, and an image cap-
turing device 140. The processor 110 is respectively coupled
to the display 120, the projectors 130-1 to 130-3, and the
image capturing device 140. In this embodiment, only the
three projectors are shown for description. However, the
disclosure is not limited thereto, and 2, 4, or more projectors
may be disposed according to actual usage conditions.

Here, the projector 130-1 is configured to project a
projection image PJ_1 to a projection surface 101. The
projector 130-2 is configured to project a projection image
PJ_2 to the projection surface 101. The projector 130-3 is
configured to project a projection image PJ_3 to the projec-
tion surface 101.

The processor 110 is, for example, a central processing
unit (CPU), a physics processing unit (PPU), a program-
mable microprocessor, an embedded control chip, a digital
signal processor (DSP), an application specific integrated
circuit (ASIC), or other similar processing devices. The
processor 110 may drive the projector 130-1, the projector
130-2, and the projector 130-3 to perform projection, and
may drive the image capturing device 140 to perform
shooting operation.

The display 120 is, for example, a liquid crystal display
(LCD), a light-emitting diode (LED) display, a plasma
display, and a touch screen, etc. In other embodiments, if the
display 120 is a self-luminous display element (such as an
organic light-emitting display element), the projector is not
required to be equipped with a light source module.

The projectors 130-1 to 130-3 include solid hardware
components such as control chips, imaging elements, pro-
jection lenses, light source modules, and optical elements for
transmitting light beams. The control chip is coupled to the
imaging element and the light source module to drive and control the imaging element and the light source module.
The imaging element is, for example, an element that may
generate an image such as a digital micromirror device
(DMD) and a liquid crystal display element. The light source
module provides an illumination beam to the imaging ele-
ment, and the imaging element converts the illumination
beam into an image beam to be projected out of the projector
through the projection lens.

In this embodiment, in order to achieve automatic image
stitching and fusion, the processor 110 drives the image
capturing device 140 to individually capture the projection
images PJ_1 to PJ_3 projected on the projection surface 101
or capture the three projection images PJ_1 to PJ_3 on the
projection surface 101 at the same time, so as to perform
image recognition and calculation required for the image
automatic stitching and fusion by using the captured images.
The image capturing device 140 may be a video camera or
a camera using a charge coupled device (CCD) lens, a
complementary metal oxide semiconductor transistor
(CMOS) lens, or the like. In addition, in other embodiments,
multiple image capturing devices may also be disposed. For
example, one projector corresponds to one image capturing
device, or two projectors correspond to one image capturing
device, etc.

The projection system 100 further includes a storage
device. For example, the storage device may be imple-
mented by using any type of fixed or removable random
access memory (RAM), read-only memory (ROM), flash
memory, secure digital card, hard disk, other similar devices,
or a combination of these devices. At least one program code
segment is stored in the storage device. After the program
code segment is installed, the processor 110 performs the
following method for adjusting the projection parameter.

In this embodiment, there are overlapping areas OL1 to
OL4 between the projection images PJ_1 to PJ_3 on the
projection plane 101, and FIG. 1 shows the four overlapping
areas OL1 to OL4. The overlapping area OL1 is an inter-
section area of the projection images PJ_1 to PJ_3. The
overlapping area OL2 is an intersection area of the projec-
tion image PJ_1 and the projection image PJ_2. The over-
lapping area OL3 is an intersection area of the projection
image PJ_2 and the projection image PJ_3. The overlapping
area OL4 is an intersection area of the projection image PJ_1
and the projection image PJ_3.

In a case that the projection images PJ_1 to PJ_3 are black
level images, brightness of each of the overlapping area OL1
to OL4 is brighter than brightness of a non-overlapping area.
In addition, the brightness of the overlapping area (for
example, the overlapping area OL1) that includes intersec-
tion of more projection images will be brighter. Through the
method for adjusting the projection parameter below, the
brightness and color performance of the black level images
in the overlapping area and non-overlapping area may be
consistent.

Figure 3A:
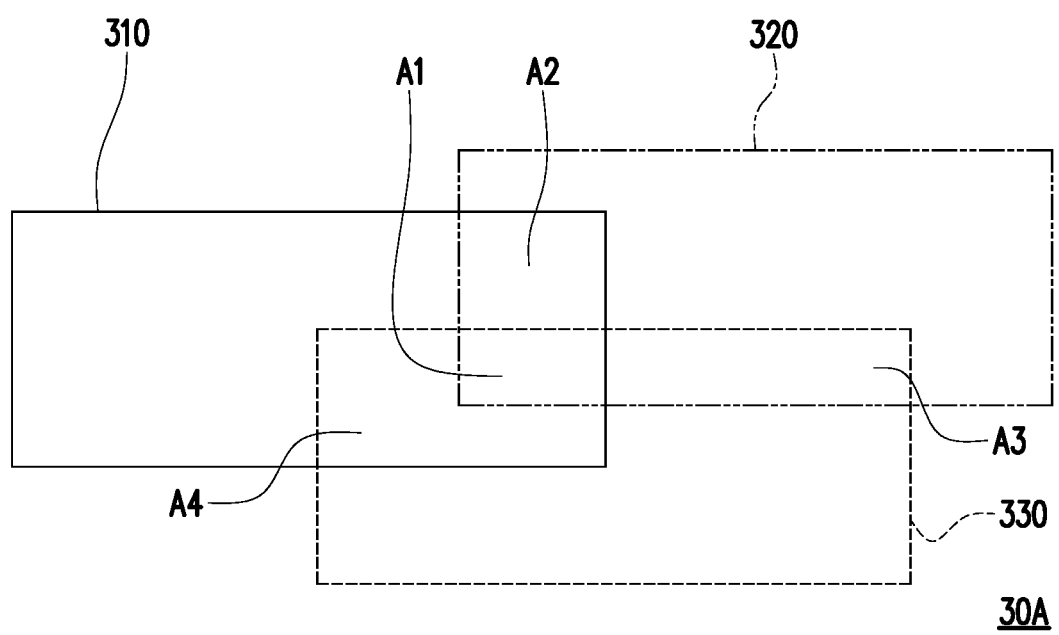
FIGS. 3A to 3C are schematic views of division for a full projection range according to an embodiment of the disclosure.
Figure 3B:
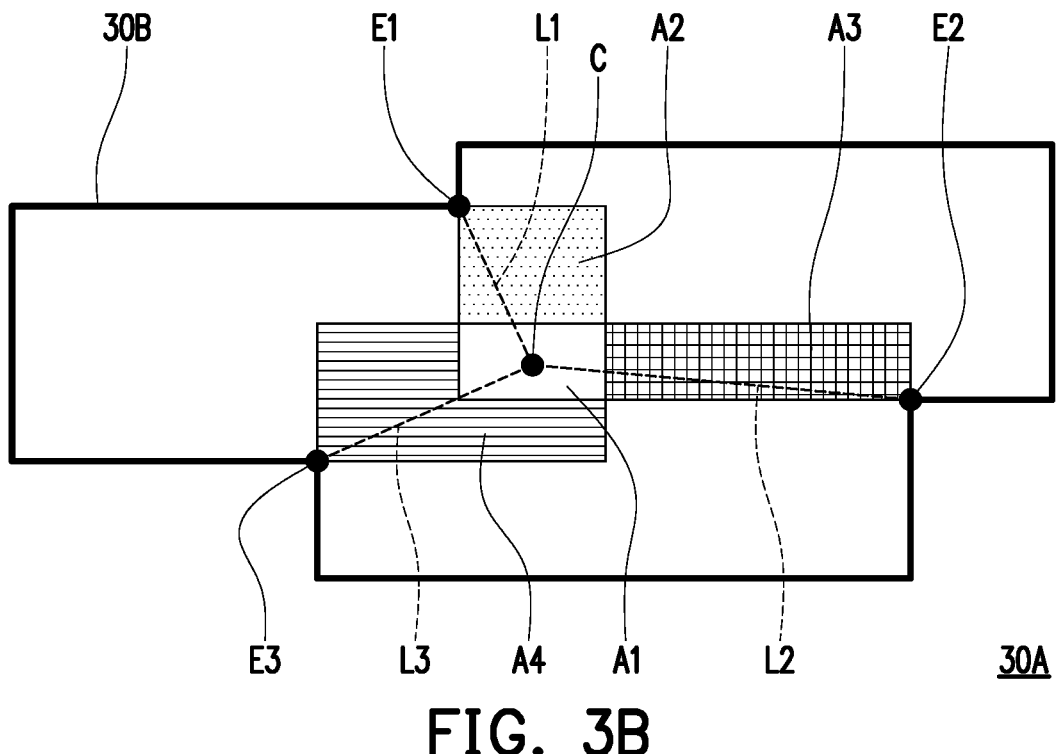
Figure 3C:
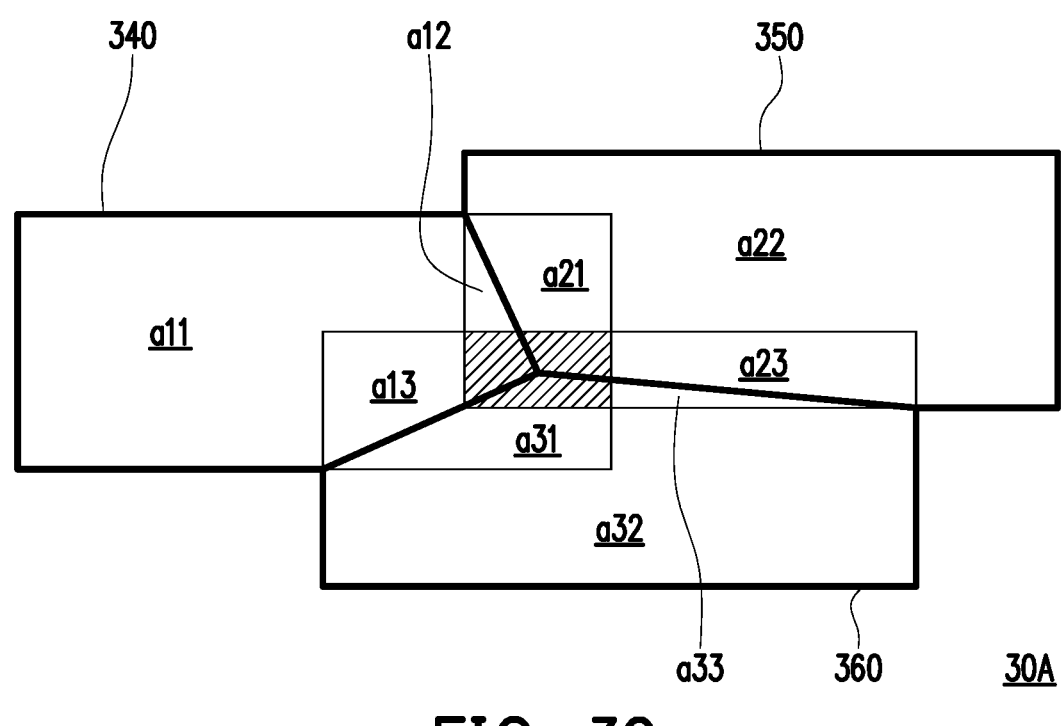

Hereinafter, an embodiment is given to describe the
method for adjusting the projection parameter in detail. FIG.
2 is a flowchart of a method for adjusting a projection
parameter according to an embodiment of the disclosure.
FIGS. 3A to 3C are schematic views of division for a full
projection range according to an embodiment of the disclo-
sure. In this embodiment, the projectors 130-1 to 130-3 in
FIG. 1 are taken as an example for description. However, the
disclosure is not limited thereto. FIGS. 1, 2, and 3A to FIG.
3C below are referred together.

First, in step S205, the projection images PJ_1 to PJ_3
individually projected by the projectors 130-1 to 130-3 are
calculated, so as to obtain a full projection range 30A formed by the projection images PJ_1 to PJ_3 (e.g., FIG. 3A). In FIG. 3A, the full projection range 30A is formed by projection areas 310 to 330. The projection areas 310 to 330 correspond to the projection images PJ_1 to PJ_3 respectively. That is, the projection images PJ_1 to PJ_3 projected by the projectors 130-1 to 130-3 respectively form the projection areas 310 to 330 on the projection surface, and the projection areas 310 to 330 form the complete full projection range 30A. The full projection range 30A includes multiple overlapping areas A1 to A4, and each of the overlapping areas corresponds to intersection of at least two of the projection images PL1 to PJ_3. The overlapping areas A1 to A4 respectively correspond to the overlapping areas OL1 to OL4 in FIG. 1.

In an embodiment, the processor 110 may obtain the full projection range 30A formed corresponding to the projection images PL1 to PJ_3 and the projection areas 310 to 330 respectively corresponding to the projection images PL1 to PJ_3 through calculation according to internal parameters, external parameters, and projection coordinate systems of the projectors 130-1 to 130-3.

In another embodiment, the full projection range 30A may also be obtained through the calculation after the image capturing device 140 is used to capture the image. The processor 110 is required to obtain the full projection range 30A according to the internal parameters, the external parameters, the projection coordinate systems of the projectors 130-1 to 130-3, and a coordinate system of the image capturing device 140. Specifically, the processor 110 drives the projectors 130-1 to 130-3 to respectively project the projection images PL1 to PJ_3 with calibration patterns (for example, checkerboard patterns) onto the projection surface 101, and when the projectors 130-1 to 130-3 independently project the individual projection images PL1 to PJ_3 onto the projection surface 101, the image capturing device 140 is driven to capture the projection surface 101. In this way, the captured images corresponding to the individual projections of the projectors 130-1 to 130-3 may be obtained. That is to say, each of the captured images only includes the projection area corresponding to the single projection image, and the processor 110 receives the captured images from the image capturing device 140. Afterwards, the processor 110 stitches the respective projection areas 310 to 330 of the captured images through the calculation (various technologies such as image processing, image recognition, and image stitching,) to obtain the full projection range 30A.

Returning to FIG. 2, after the full projection range 30A is obtained, in step S210, a target area is selected from the overlapping areas A1 to A4, and a target projection parameter value of the target area is obtained. In this embodiment, the full projection range 30A includes the four overlapping areas A1 to A4. The processor 110 selects the overlapping area A1 formed by intersection with the most projection images among the overlapping areas A1 to A4 as the target area (hereinafter referred to as a target area A1). In addition, the processor 110 obtains a target projection parameter value of the target area A1. For example, a target color value and/or a target brightness value of the target area A1 is obtained.

In other embodiments, if the full projection range includes only one overlapping area, this overlapping area is selected as the target area.

Referring to FIG. 3B, in step S215, multiple intersection points E1 to E3 of the overlapping area A1 to A4 on a boundary 30B of the full projection range 30A are obtained. In FIG. 3B, since the overlapping area A1 has been used as the target area, the processor 110 finds out whether there is an intersection point between the remaining overlapping areas A2, A3, and A4 and the boundary 30B of the full projection range 30A. The processor 110 finds out the intersection point E1 between the overlapping area A2 and the boundary 30B, finds out the intersection point E2 between the overlapping area A3 and the boundary 30B, and finds out the intersection point E3 between the overlapping area A4 and the boundary 30B.

Next, in step S220, multiple connecting lines between a center point C of the target area A1 and the intersection points E1 to E3 are defined as multiple dividing lines L1 to L3, so as to divide the full projection range 30A into multiple sub-areas a11 to a13, a21 to a23, and a31 to a33 (as shown in FIG. 3C). In this embodiment, the dividing lines L1 to L3 are straight lines directly connected from the center point C to the intersection points E1 to E3, respectively. In other embodiments, the dividing lines L1 to L3 may also be arc lines.

After the dividing lines L1 to L3 are obtained, the processor 110 divides adjustment areas 340 to 360 individually corresponding to the projectors 130-1 to 130-3 in the full projection range 30A based on the dividing lines L1 to L3 and the boundary 30B of the full projection range 30A.

Referring to FIGS. 2, 3A, and 3C together, in an embodiment, the processor 110 may determine the corresponding projector according to the non-overlapping area included in each of the adjustment areas. The non-overlapping area in the adjustment area 340 is the sub-area a11, which is located in the projection area 310 (as shown in FIG. 3A). Therefore, the adjustment area 340 corresponds to the projection area 310 of the projector 130-1. That is to say, the adjustment of the sub-areas a11 to a13 in the adjustment area 340 will be presented through the projector 130-1. By analogy, the non-overlapping area in the adjustment area 350 is the sub-area a22. Therefore, the adjustment area 350 corresponds to the projection area 320 (as shown in FIG. 3A) of the projector 130-2. The non-overlapping area in the adjustment area 360 is the sub-area a32. Therefore, the adjustment area 360 corresponds to the projection area 330 (as shown in FIG. 3A) of the projector 130-3.

Referring to FIGS. 2, 3A, 3B, and 3C together, in another embodiment, the processor 110 may also determine which projectors the adjustment areas 340 to 360 correspond to respectively according to endpoints of the dividing lines L1 to L3 after dividing the adjustment areas 340 to 360 based on the dividing lines L1 to L3 and the boundary 30B of the full projection range 30A. In terms of the adjustment area 340, a boundary thereof includes the dividing line L1 and the dividing line L3. The endpoints of the dividing line L1 and the dividing line L3 are both at a boundary of the projection area 310 corresponding to the projector 130-1. Therefore, the adjustment area 340 is set to correspond to the projector 130-1. By analogy, the adjustment area 350 is set to correspond to the projector 130-2, and the adjustment area 360 is set to correspond to the projector 130-3.

Afterwards, based on the non-overlapping areas and overlapping areas included in the adjustment areas 340 to 360, the processor 110 divides the adjustment area 340 into sub-areas a11 to a13, divides the adjustment area 350 into the sub-areas a21 to a23, and divides the adjustment area 360 into the sub-areas a31 to a33. Here, the divided sub-areas do not include the target area A1 and do not overlap. That is, a range corresponding to the target area A1 in the adjustment areas 340 to 360 is not adjusted.

In addition, the processor 110 may further display the full projection range 30A and the dividing lines L1 to L3 as shown in FIG. 3C through the display 120, or display the divided adjustment areas 340 to 360 respectively through the display 120.

After the sub-areas a11 to a13, a21 to a23, and a31 to a33 are obtained, in step S225, according to the target projection parameter value of the target area A1, a projection parameter value of each of the sub-areas a11 to a13, a21 to a23, and a31 to a33 are adjusted, respectively.

In an embodiment, the target projection parameter value is the target color value, and the projection parameter value of each of the sub-areas a11 to a13, a21 to a23, a31 to a33 is a color value. The color value of each of the sub-areas is adjusted based on the target color value to obtain an adjusted color value (an adjusted projection parameter value). In another embodiment, the target projection parameter value is the target brightness value, and the projection parameter value of each of the sub-areas a11 to a13, a21 to a23, and a31 to a33 is a brightness value. The brightness value of each of the sub-areas is adjusted based on the target brightness value to obtain an adjusted brightness value (the adjusted projection parameter value).

In addition, in step S230, based on the adjusted projection parameter value of each of the sub-areas a11 to a13, a21 to a23, and a31 to a33, projection is performed through the corresponding projector. That is, based on the adjusted projection parameter values of the sub-areas a11 to a13, the projection is performed through the projector 130-1. Based on the adjusted projection parameter values of the sub-areas a21 to a23, the projection is performed through the projector 130-2. Based on the adjusted projection parameter values of the sub-areas a31 to a33, the projection is performed through the projector 130-3.

For example, if the display 120 is the touch screen, a user directly operates/selects on the display 120. In addition, the user may operate/select on the display 120 through an input device such as a mouse or a stylus. In other embodiments, the processor 110 automatically adjusts the projection parameter value of each of the sub-areas a11 to a13, a21 to a23, and a31 to a33 directly according to the target projection parameter value of the target area A1, so that each of the sub-areas a11 to a13, a21 to a23, and a31 to a33 has the same adjusted projection parameter value. In addition, the target projection parameter value of the projection area and the projection parameter value of the sub-area may be, for example, a parameter average value of the corresponding target area or sub-area, such as a brightness average value or a color average value.

In an embodiment, in response to the full projection range 30A divided by the dividing lines L1 to L3 (as shown in FIG. 3C), the processor 110 displays the adjustment area corresponding to at least one projector in the full projection range 30A through the display 120. For example, only the adjustment area 340 is displayed on the display 120. Next, one of the sub-areas a11 to a13 is selected through the display 120. Assuming that the sub-area a11 is selected, the processor 110 displays a projection parameter adjustment interface on the display 120 for the user to adjust the projection parameter value of the sub-area a11 on the projection parameter adjustment interface based on the target projection parameter value of the target area A1.

Assuming that the target projection parameter value is target color value, and the target color value of R, G, and B of the target area A1 are 12, 12, and 12, the projection parameter adjustment interface is used to adjust the projection parameter values of the sub-area a11 to 12, 12, and 12. By analogy, the sub-areas a12 and a13 are adjusted. For example, the projection parameter values of the sub-area a11 are R, G, and B of 6, 6, and 6. Through the projection parameter adjustment interface, the projection parameter values of the sub-area a11 are adjusted to be the same as or similar to the target color value of the target area A1. That is, the adjusted projection parameter values of the sub-area a11 are 12, 12, and 12. The projection parameter values of the sub-area a12 are R, G, and B of 10, 10, and 9. Through the projection parameter adjustment interface, the projection parameter values of the sub-area a12 are adjusted to be the same as or similar to the target color value of the target area A1. That is, the adjusted projection parameter values of the sub-area a12 are 12, 12, and 12. Afterwards, the projection parameter values for the sub-areas included in the adjustment region 350 and the adjustment region 360 are adjusted respectively, so that the adjusted projection parameter values of all the sub-areas are the same or close to the target projection parameter value of the target area A1. Each of the sub-areas and the target area are confirmed through eyes of the user or through the image capturing device.

In addition, as shown in FIG. 3C, all the adjustment areas 340 to 360 may be displayed, and each of the sub-areas may be clicked one by one for adjustment. In other embodiments, the display 120 displays the projection area of the full projection range 30A corresponding to the at least one projector. However, only the adjustment area (the sub-area) corresponding to the projection area may be adjusted.

In the above embodiment, in order to obtain the full projection range 30A, the processor 110 drives the projectors 130-1 to 130-3 to respectively project the projection images with the checkerboard patterns (the calibration patterns). After the full projection area 30A is divided into the sub-areas, the processor 110 re-drives the projectors 130-1 to 130-3 to project the black level images, thereby obtaining the target projection parameter value of the target area A1. For example, when the black level images projected by the projectors 130-1 to 130-3 are on the projection surface 101 at the same time, the image capturing device 140 is driven to capture the projection surface 101 to obtain a full projection image, and based on a previously obtained coordinate position of the target area, the target projection parameter value of the target area is taken from the captured full projection image.

After the projection parameter values of one or more of the sub-areas are adjusted through the display 120, the processor 110 drives the corresponding projector to project based on the adjusted projection parameter. For example, after one or more of the sub-areas a11 to a13 of the adjustment area 340 are adjusted, the projector 130-1 is driven to project based on the adjusted projection parameter. The rest may be derived by analog. Accordingly, if the user thinks that the projection effect is not good, the projection parameter value of the sub-area may be readjusted through the display 120.

In addition, it is further explained that the dividing lines L1 to L3 are the straight lines or arc lines. However, in other embodiments, the dividing lines L1 to L3 may further be set as follows. Each of the dividing lines has the two endpoints, and the two endpoints are respectively the center point of the target area and one of the intersection points. In addition, at least one intermediate node is included between the two endpoints, and the intermediate node is located on the boundary of the overlapping area. Since the sub-areas divided by the dividing lines may cause the projection areas of the adjacent projectors to be uneven in size, the intermediate node is added to adjust the dividing lines, which may allow the subsequent adjustment of the projection parameter values to be more flexible. The example is given below for description.

Figure 4:
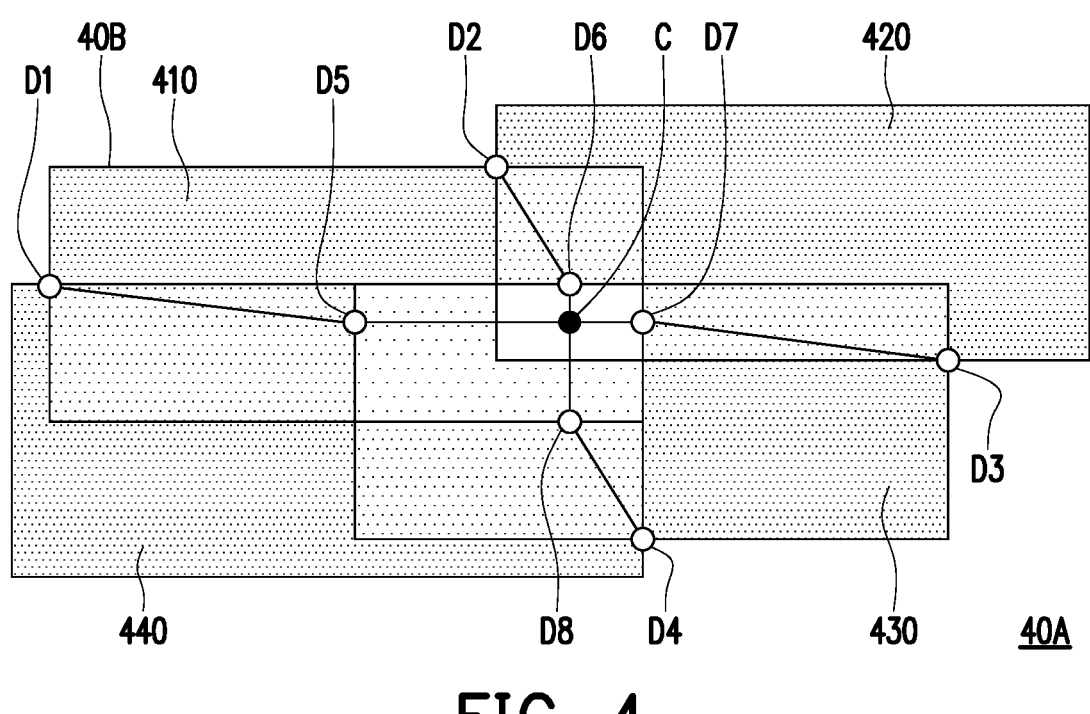
FIG. 4 is a schematic view of division for a full projection range according to another embodiment of the disclosure.

FIG. 4 is a schematic view of division for a full projection range according to another embodiment of the disclosure. In the embodiment shown in FIG. 4, projection areas 410 to 440 respectively correspond to the projection images projected by the four projectors. The projection areas 410 to 440 form a full projection range 40A. In the full projection range 40A, the overlapping area with the intersection of the most projection areas is found out as the target area, and the center point C of the target area is taken out. Next, intersection points D1 to D4 of other remaining overlapping areas and a boundary 40B of the full projection range 40A are found out. Afterwards, an intermediate node D5 between the center point C and the intersection point D1 is taken out. An intermediate node D6 between the center point C and the intersection point D2 is taken out. An intermediate node D7 between the center point C and the intersection point D3 is taken out. An intermediate node D8 between the center point C and intersection point D4 is taken out. Afterwards, the center point C, the intermediate node D5, and the intersection point D1 are connected to form a turning dividing line (not numbered). The center point C, the intermediate node D6, and the intersection point D2 are connected to form a turning dividing line (not numbered). The center point C, the intermediate node D7, and the intersection point D3 are connected to form a turning dividing line (not numbered). The center point C, the intermediate node D8, and the intersection point D4 are connected to form a turning dividing line (not numbered). Accordingly, a division result shown in FIG. 4 is obtained. For the adjustment and projection of the projection parameter values after the sub-areas are obtained, reference may be made to the embodiments of FIGS. 2 and 3A to 3C. Therefore, the same details will not be repeated in the following.

In addition, the above embodiments may also be applied in a case of two or more target areas. An example is given below for description of a case of two target areas.

Figure 5A:
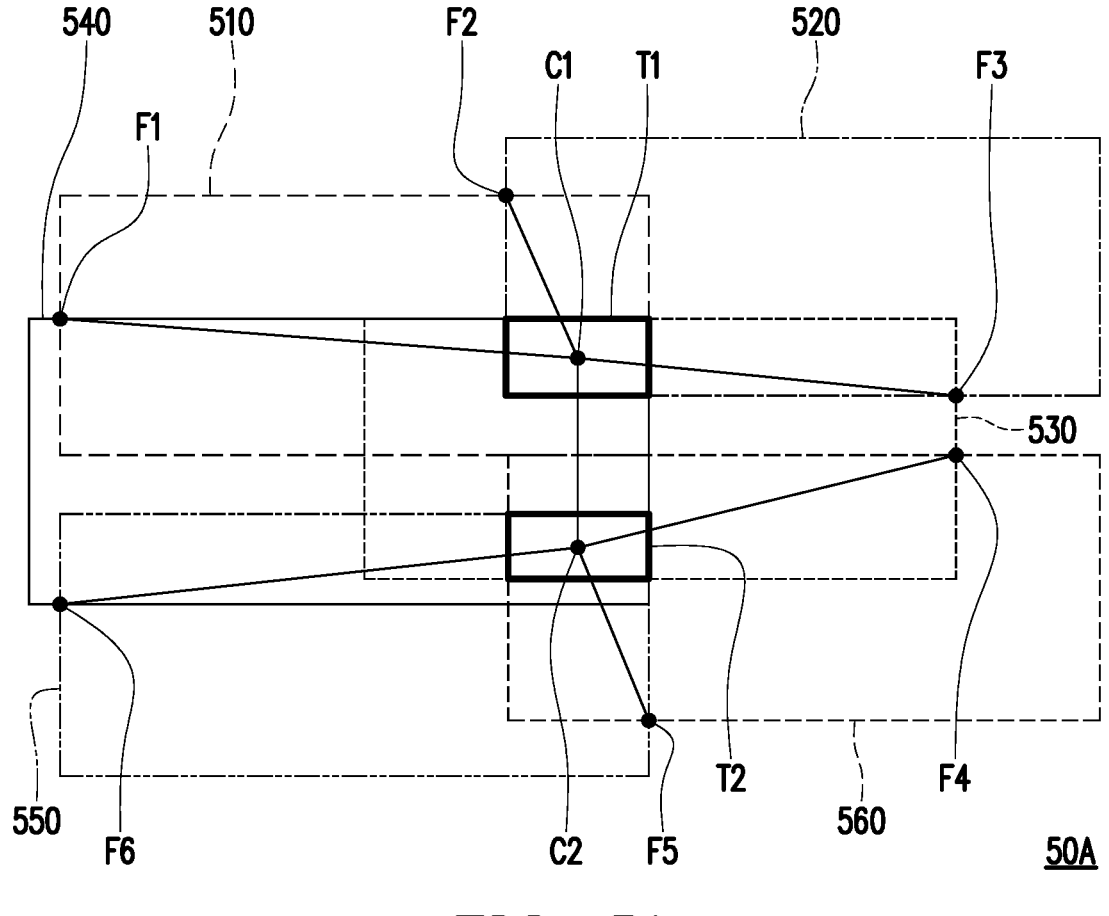
FIGS. 5A and 5B are schematic views of division for a full projection range according to another embodiment of the disclosure.
Figure 5B:
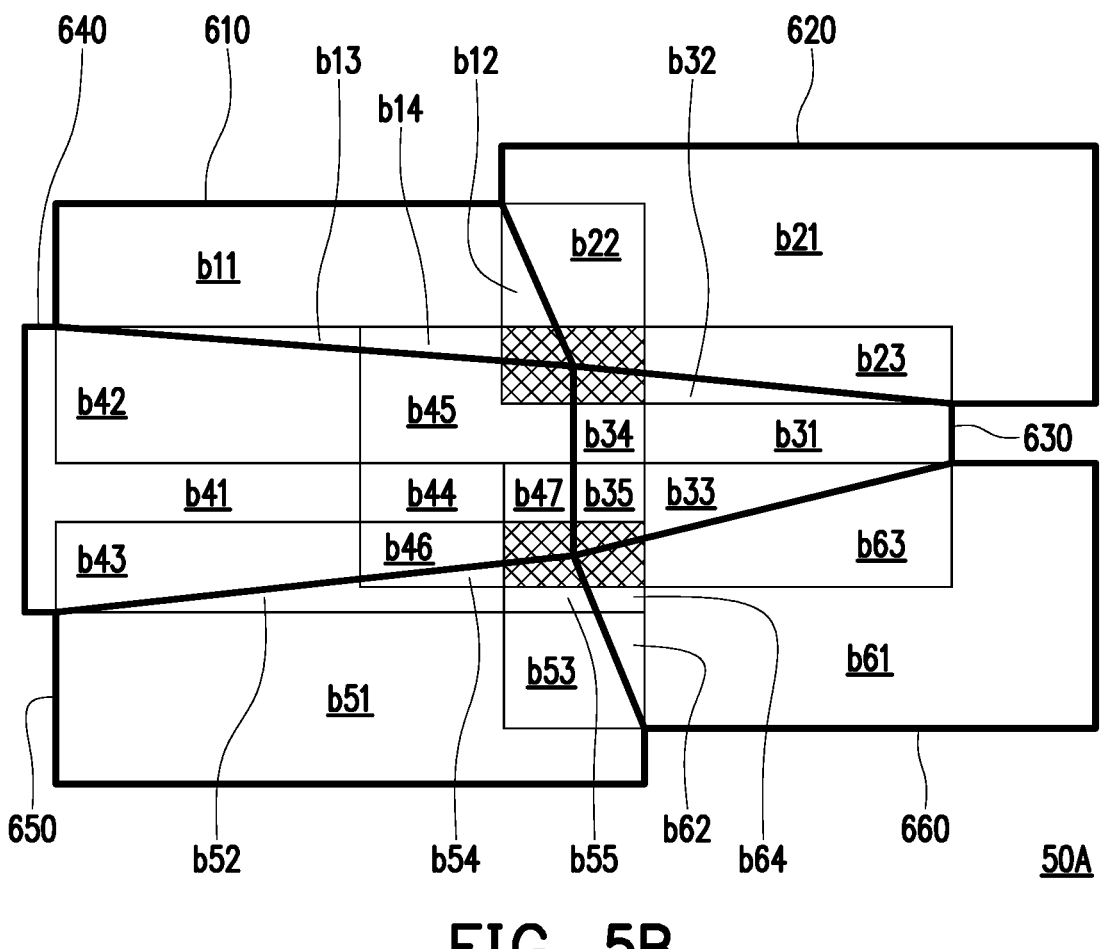

FIGS. 5A and 5B are schematic views of division for a full projection range according to another embodiment of the disclosure. In the embodiment shown in FIG. 5A, projection areas 510 to 560 respectively correspond to the projection images projected by the six projectors (which are respectively numbered as P1 to P6 here). The projection areas 510 to 560 form a full projection range 50A. Since there are two overlapping areas formed by the intersection of the four projection areas in the full projection range 50A, the two overlapping areas are used as target areas T1 and T2 at the same time. The target area T1 includes the intersection of the four projection areas 510 to 540, and the target area T2 includes the intersection of the four projection areas 530 to 560.

Multiple intersection points F1 to F6 of the overlapping areas caused by the projection areas 510 to 560 on a boundary of the full projection range 50A are found out. Next, dividing lines are obtained for the target area T1 and the target area T2 respectively.

In terms of the target area T1, the intersection points F1, F2, and F3 on the projection areas 510 to 540 forming the target area T1 are found out. Afterwards, a center point C1 from the target area T1 is connected to the intersection points F1, F2, and F3 respectively to form three dividing lines.

Next, in terms of the target area T2, among the remaining intersection points F4 to F6 after F1, F2, and F3 that have formed the dividing lines are deducted, the intersection points F4, F5, and F6 on projection areas 530 to 560 that forming the target area T2 are found out. Afterwards, a center point C2 from the target area T2 is connected to the intersection points F4, F5, and F6 respectively to form three dividing lines.

Afterwards, the center point C1 of the target area T1 is connected to the center point C2 of the target area T2 to form one dividing line. Accordingly, based on the dividing lines (the seven dividing lines) and the boundary of the full projection range 50A, adjustment areas 610 to 660 as shown in FIG. 5B are formed.

Then, based on non-overlapping areas and overlapping areas included in the adjustment areas 610 to 660, the processor 110 divides the adjustment area 610 into sub-areas b11 to b14, divides the adjustment area 620 into sub-areas b21 to b23, divides the adjustment area 630 into sub-areas b31 to b35, divides the adjustment area 640 into sub-areas b41 to b47, divides the adjustment area 650 into sub-areas b51 to b55, and divides the adjustment area 660 into sub-areas b61 to b64. Here, the divided sub-areas do not include the target areas T1 and T2.

The processor 110 may determine the corresponding projector according to the non-overlapping areas included in the adjustment areas 610 to 660. In terms of the adjustment area 610, the non-overlapping area thereof is the sub-area b11 located in the projection area 510. Therefore, the adjustment area 610 corresponds to the projector P1. By analogy, the adjustment areas 620 to 660 correspond to the projectors P2 to P6 respectively.

Here, since the numbers of the overlapping projection areas of the target areas T1 and T2 are the same, target projection parameter values of the target areas T1 and T2 are the same. Based on the target projection parameter values, projection parameter values of the sub-areas b11 to b14, b21 to b23, b31 to b35, b41 to b47, b51 to b55, and b61 to b64 are adjusted one by one to obtain the adjusted projection parameter values. For the adjustment method, reference may be made to the embodiments of FIGS. 2 and 3A to 3C. Therefore, the same details will not be repeated in the following.

After the projection parameter values of one or more of the sub-areas are adjusted through the display 120, the processor 110 drives the corresponding projector to project based on the adjusted projection parameter values. For example, after one or more of the sub-areas b41 to b47 of the adjustment region 640 are adjusted, the projector P4 is driven to project based on the adjusted projection parameter values. The rest may be derived by analog.

Based on the above, in this disclosure, the target area and the dividing lines are calculated, thereby dividing the full projection range into the non-overlapping sub-areas, and then the projection parameter value of each of the sub-areas is adjusted to conform to the target area. Accordingly, an influence range of the value of each of the sub-areas is independent, and a compensation area corresponding to each of the projector does not overlap, which may avoid the same block from being compensated separately by two projectors and reduce the time for adjustment.

Moreover, compared to a conventional method of compensating the light leakage area at the edge of each of the projection areas is required to adjust the light leakage area as an independent adjustment manner from the overlapping area, since the division of the sub-areas in the above embodiments may cover the light leakage area at the edge of the projection area generated by each of the projectors when projecting the black level image, the additional operation that to compensate for the light leakage area is omitted.

In addition, the dividing lines disclosed in the disclosure may be flexibly set, and the intermediate nodes may be added according to requirements to adjust the range of the sub-areas accordingly, which may allow the subsequent adjustment of the projection parameter values to be more flexible.

The above are only preferred embodiments of the disclosure and are not intended to limit the scope of the disclosure; that is, all simple and equivalent changes and modifications made according to the claims and the contents of the disclosure are still within the scope of the disclosure. In addition, any of the embodiments or the claims of the disclosure are not required to achieve all of the objects or advantages or features disclosed herein. In addition, the abstract and title are used to assist in the search of patent documents and are not intended to limit the scope of the disclosure. In addition, the terms "first," "second" and the like mentioned in the specification or the claims are used only to name the elements or to distinguish different embodiments or scopes and are not intended to limit the upper or lower limit of the number of the elements.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A method for adjusting a projection parameter performed through a processor, wherein the method comprising the steps of:

calculating a plurality of projection images individually projected by a plurality of projectors to obtain a full projection range formed by the plurality of projection images, wherein the full projection range comprises at least one overlapping area, and the at least one overlapping area corresponds to intersection of at least two of the plurality of projection images;

selecting a target area from the at least one overlapping area, and obtaining a target projection parameter value of the target area;

obtaining a plurality of intersection points of the at least one overlapping area on a boundary of the full projection range;

defining a plurality of connecting lines between a center point of the target area and the plurality of intersection points as a plurality of dividing lines to divide the full projection range into a plurality of sub-areas;

respectively adjusting a projection parameter value of each of the plurality of sub-areas according to the target projection parameter value of the target area and obtaining an adjusted projection parameter value; and performing projection through a corresponding projector of the plurality of projectors based on the adjusted projection parameter value of each of the plurality of sub-areas.

2. The method for adjusting the projection parameter according to claim 1, wherein the target projection parameter value comprises a target color value, the projection parameter value of each of the plurality of sub-areas comprises a color value, and the adjusted projection parameter value of each of plurality of the sub-areas comprises an adjusted color value.

3. The method for adjusting the projection parameter according to claim 1, wherein the target projection parameter value comprises a target brightness value, the projection parameter value of each of the plurality of sub-areas comprises a brightness value, and the adjusted projection parameter value of each of plurality of the sub-areas comprises an adjusted brightness value.

4. The method for adjusting the projection parameter according to claim 1, further comprising:

driving the plurality of projectors to respectively project the plurality of projection images with calibration patterns onto a projection surface, and driving an image capturing device to capture an image of the projection surface when each of the plurality of projectors independently projects the projection image onto the projection surface, thereby obtaining a plurality of captured images corresponding to the plurality of projectors when independently projecting, wherein each of the plurality of captured images comprises a projection area corresponding to a single projection image; and stitching the projection areas of the plurality of captured images to obtain the full projection range, wherein the at least one overlapping area comprises intersection of at least two of the projection areas.

5. The method for adjusting the projection parameter according to claim 1, wherein the step of selecting the target area from the at least one overlapping area comprises:

in response to the at least one overlapping area being plural, selecting the overlapping area formed by intersection of the projection areas corresponding to the most projection images as the target area; and in response to the at least one overlapping area being one, selecting the overlapping area as the target area.

6. The method for adjusting the projection parameter according to claim 1, wherein the step of defining the plurality of connecting lines between the center point of the target area and the plurality of intersection points as the plurality of dividing lines to divide the full projection range into the plurality of sub-areas comprises:

dividing an adjustment area corresponding to each of the plurality of projectors in the full projection range based on the plurality of dividing lines and the boundary of the full projection range; and dividing the adjustment area into the plurality of sub-areas, wherein the plurality of sub-areas do not comprise the target area based on a non-overlapping area and the at least one overlapping area included in the adjustment area.

7. The method for adjusting the projection parameter according to claim 6, wherein the step of respectively adjusting the projection parameter value of each of the plurality of sub-areas according to the projection parameter value of the target area and obtaining an adjusted projection parameter value comprises:

in response to the full projection range divided by the plurality of dividing lines, displaying the adjustment area corresponding to at least one of the plurality of projectors in the full projection range through a display;

in response to selecting one of the plurality of sub-areas through the display, displaying a projection parameter adjustment interface on the display; and adjusting the projection parameter value of a selected sub-area on the projection parameter adjustment interface based on the target projection parameter value of the target area.

8. The method for adjusting the projection parameter according to claim 1, wherein the plurality of dividing lines are straight lines or arc lines directly connected from the center point to each of the plurality of intersection points respectively.

9. The method for adjusting the projection parameter according to claim 1, wherein each of the plurality of dividing lines has two endpoints, the two endpoints are respectively the center point of the target area and one of the plurality of intersection points, at least one intermediate node is comprised between the two endpoints, and the at least one intermediate node is located on a boundary of the at least one overlapping area.

10. The method for adjusting the projection parameter according to claim 1, further comprising:

displaying the full projection range and the plurality of dividing lines through a display.

11. A projection system, comprising a plurality of projectors and a processor, wherein the processor is coupled to the plurality of projectors, and the processor is configured to:

drive the plurality of projectors to respectively project a plurality of projection images;

calculate the plurality of projection images to obtain a full projection range formed by the plurality of projection images, wherein the full projection range comprises at least one overlapping area, and the at least one overlapping area corresponds to intersection of at least two of the plurality of projection images;

select a target area from the at least one overlapping area, and obtain a target projection parameter value of the target area;

obtain a plurality of intersection points of the at least one overlapping area on a boundary of the full projection range;

define a plurality of connecting lines between a center point of the target area and the plurality of intersection points as a plurality of dividing lines to divide the full projection range into a plurality of sub-areas;

respectively adjust a projection parameter value of each of the plurality of sub-areas according to the target projection parameter value of the target area and obtain an adjusted projection parameter value; and perform projection through a corresponding projector of the plurality of projectors based on the adjusted projection parameter value of each of the plurality of sub-areas.

12. The projection system according to claim 11, wherein the target projection parameter value comprises a target color value, the projection parameter value of each of the plurality of sub-areas comprises a color value, and the adjusted projection parameter value of each of the plurality of sub-areas comprises an adjusted color value.

13. The projection system according to claim 11, wherein the target projection parameter value comprises a target brightness value, the projection parameter value of each of the plurality of sub-areas comprises a brightness value, and the adjusted projection parameter value of each of the plurality of sub-areas comprises an adjusted brightness value.

14. The projection system according to claim 11, further comprising an image capturing device coupled to the processor, wherein the processor is configured to:

drive the plurality of projectors to respectively project the plurality of projection images with calibration patterns onto a projection surface, and drive the image capturing device to capture an image of the projection surface when each of the plurality of projectors independently projects the projection image onto the projection surface, thereby obtaining a plurality of captured images corresponding to the plurality of projectors when independently projecting, wherein each of the plurality of captured images comprises a projection area corresponding to a single projection image; and stitch the projection areas of the plurality of captured images to obtain the full projection range, wherein the at least one overlapping area comprises intersection of at least two of the projection areas.

15. The projection system according to claim 11, wherein the processor is configured to:

in response to the at least one overlapping area being plural, select the overlapping area formed by intersection of the projection areas corresponding to the most projection images as the target area; and in response to the at least one overlapping area being one, select the overlapping area as the target area.

16. The projection system according to claim 11, wherein the processor is configured to:

divide an adjustment area corresponding to each of the plurality of projectors in the full projection range based on the plurality of dividing lines and the boundary of the full projection range; and divide the adjustment area into the plurality of sub-areas, wherein the plurality of sub-areas do not comprise the target area based on a non-overlapping area and the at least one overlapping area included in the adjustment area.

17. The projection system according to claim 16, further comprising a display coupled to the processor, wherein the processor is configured to:

in response to the full projection range divided by the plurality of dividing lines, display the adjustment area corresponding to at least one of the plurality of projectors in the full projection range through the display;

in response to selecting one of the plurality of sub-areas through the display, display a projection parameter adjustment interface on the display; and adjust the projection parameter value of a selected sub-area on the projection parameter adjustment interface based on the target projection parameter value of the target area.

18. The projection system according to claim 11, wherein the plurality of dividing lines are straight lines or arc lines directly connected from the center point to each of the plurality of intersection points respectively.

19. The projection system according to claim 11, wherein each of the plurality of dividing lines has two endpoints, the two endpoints are respectively the center point of the target area and one of the plurality of intersection points, at least one intermediate node is comprised between the two endpoints, and the at least one intermediate node is located on a boundary of the at least one overlapping area.

20. The projection system according to claim 11, further comprising a display coupled to the processor, wherein the display displays the full projection range and the plurality of dividing lines.

* * * * *